US008287293B1

(12) United States Patent
Gao et al.

(10) Patent No.: US 8,287,293 B1
(45) Date of Patent: Oct. 16, 2012

(54) CARD CONNECTOR

(75) Inventors: Lei Gao, Guang-Dong (CN); Yin-Lung Wu, New Taipei (TW); Ming-Chiang Chen, New Taipei (TW); Bing-Tao Yang, Guang-Dong (CN)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/212,149

(22) Filed: Aug. 17, 2011

(51) Int. Cl.
*H01R 13/62* (2006.01)

(52) U.S. Cl. .................. 439/159; 439/630; 439/607.33

(58) Field of Classification Search .................. 439/157, 439/159, 325, 327, 347, 630, 607.33
See application file for complete search history.

(56) References Cited

U.S. PATENT DOCUMENTS

| 5,231,274 | A * | 7/1993 | Reynier et al. ............... 235/441 |
| 6,382,995 | B1 * | 5/2002 | Bricaud et al. ............... 439/159 |
| 6,550,684 | B1 * | 4/2003 | Zuin et al. .................... 235/486 |
| 7,118,397 | B1 * | 10/2006 | Su et al. ........................ 439/159 |
| 7,192,292 | B1 * | 3/2007 | Su .................................. 439/159 |
| 7,322,838 | B1 * | 1/2008 | Chen et al. ................... 439/159 |
| 7,338,326 | B2 * | 3/2008 | Su .................................. 439/638 |
| 7,914,330 | B2 * | 3/2011 | Su et al. .................. 439/607.31 |
| 8,147,262 | B1 * | 4/2012 | Su et al. ........................ 439/159 |
| 2007/0249234 | A1 * | 10/2007 | Su .................................. 439/638 |
| 2010/0233911 | A1 * | 9/2010 | Su et al. ........................ 439/629 |

* cited by examiner

*Primary Examiner* — Neil Abrams
*Assistant Examiner* — Phuongchi Nguyen
(74) *Attorney, Agent, or Firm* — Cheng-Hu Chiang

(57) ABSTRACT

A card connector for receiving a card includes an insulating housing, a plurality of conductive terminals received in the insulating housing, an ejection mechanism and a shielding shell covered on the insulating housing. The insulating housing defines a guiding groove. The ejection mechanism assembled in the insulating housing includes a sliding block, an elastic element and a guide pin. The sliding block has a base body, a sliding body extending sideward from one side of the base body for ejecting the card out, and a locking body extending frontward from a root of the sliding body and spaced from the one side of the base body to define a positioning passage therebetween for guiding the card to enter the insulating housing, a guiding block protruded at a bottom of the locking body to be slidably located in the guiding groove to guide the slide of the sliding block.

5 Claims, 6 Drawing Sheets

CARD CONNECTOR

BACKGROUND OF THE INVENTION

1. Field of the Invention

The present invention generally relates to an electrical connector, and more particularly to a card connector capable of receiving a card therein.

2. The Related Art

A conventional card connector includes an insulating housing, a plurality of conductive terminals received in the insulating housing, a shielding shell and an ejection mechanism. The shielding shell is covered on the insulating housing to define a receiving space therebetween. The ejection mechanism located in one side of the insulating housing includes a sliding block, an elastic element and a guide pin. The sliding block defines a guiding groove. The elastic element is located between an inner end of the one side of the insulating housing and the sliding block. One end of the guide pin is fastened in the insulating housing and the other end of the guide pin is slidably located in the guiding groove. When a card is inserted into the receiving space of the card connector, push the card rearward to drive the sliding block to slide rearward until the guide pin is locked in the guiding groove. When the card is drawn out of the receiving space, push the card rearward again to make the guide pin re-slide in the guiding groove. Then the elastic element is released to drive the sliding block to slide forward so as to eject the card out of the card connector until the guide pin returns to an original position in the guiding groove.

However, there is no guiding structure in the insulating housing, the card is apt to be deviated on the insulating housing in the process of inserting the card into the card connector or drawing the card out of the card connector.

SUMMARY OF THE INVENTION

An object of the present invention is to provide a card connector adapted for receiving a card. The card connector includes an insulating housing, a plurality of conductive terminals, an ejection mechanism and a shielding shell. The insulating housing has a bottom wall, a rear wall extending upward from a rear of the bottom wall, and two side walls extending upward from two opposite sides of the bottom wall and connected with two ends of the rear wall to define a receiving space thereamong for receiving the card. One side of the bottom wall defines a receiving trough extending along an insertion direction of the card adjacent to one side wall and communicated with the receiving space. The bottom wall defines a guiding groove extending longitudinally and adjacent to an inner side of the receiving trough. The conductive terminals are received in the insulating housing and projects into the receiving space for electrically connecting with the card. The ejection mechanism is assembled in the one side of the insulating housing, and includes a sliding block slidably disposed in the receiving trough, an elastic element clipped between the sliding block and a rear face of the receiving trough and a guide pin of an inverted-U shape of which one end is fastened in a front of the one side of the insulating housing and the other end is slidably located in the sliding block. The sliding block has a base body, a sliding body transversely extending sideward from a rear of one side of the base body to stretch into the receiving space for ejecting the card out, and a locking body extending frontward from a root portion of the sliding body and spaced from a bottom of the one side of the base body to define a positioning passage therebetween for guiding the card to enter the receiving space. A guiding block is protruded at a bottom of the locking body to be slidably located in the guiding groove so as to guide the slide of the sliding block. The shielding shell is covered on the insulating housing.

As described above, the card is inserted into the card connector by means of sliding in the positioning passage to enter the receiving space of the insulating housing to prevent the card deviating in the receiving space. Moreover, the guiding block slides in the guiding groove with the locking blocks blocked under two sidewalls of the guiding groove so as to ensure a straight movement of the sliding block for further avoiding the card deviating. So, the card can be received in the receiving space accurately and steadily.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
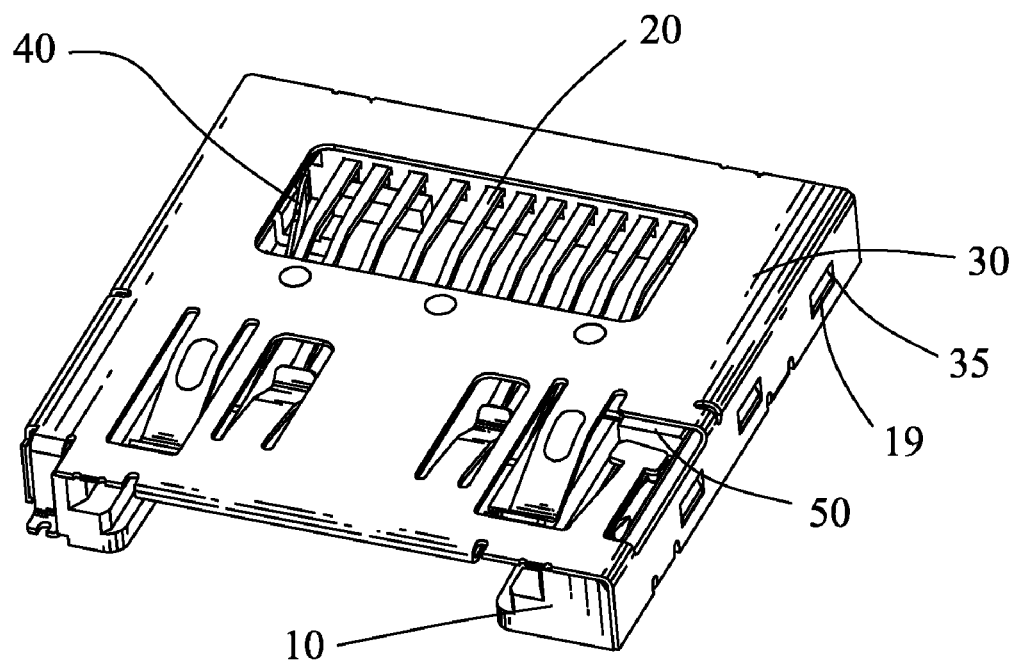
FIG. 1 is a perspective view of a card connector in accordance with the present invention.

With reference to FIGS. 1-8, a card connector 100 in accordance with the present invention is shown. The card connector 100 adapted for receiving a card 200 includes an insulating housing 10, a plurality of conductive terminals 20 including a plurality of first conductive terminals 21 and a plurality of second conductive terminals 22, a shielding shell 30, a switch terminal assembly 40 and an ejection mechanism 50.

Figure 3:
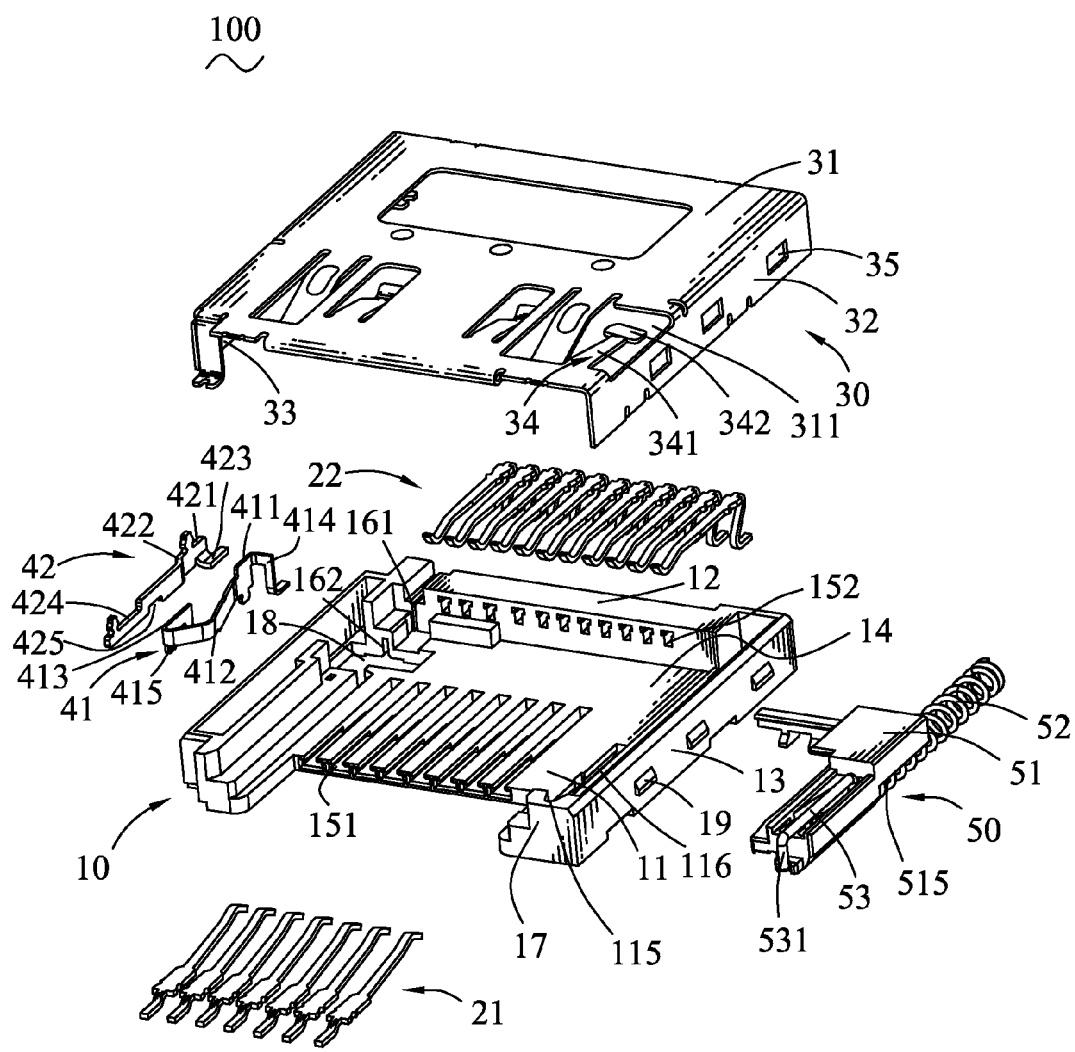
FIG. 3 is an exploded view of the card connector of FIG. 2.
Figure 4:
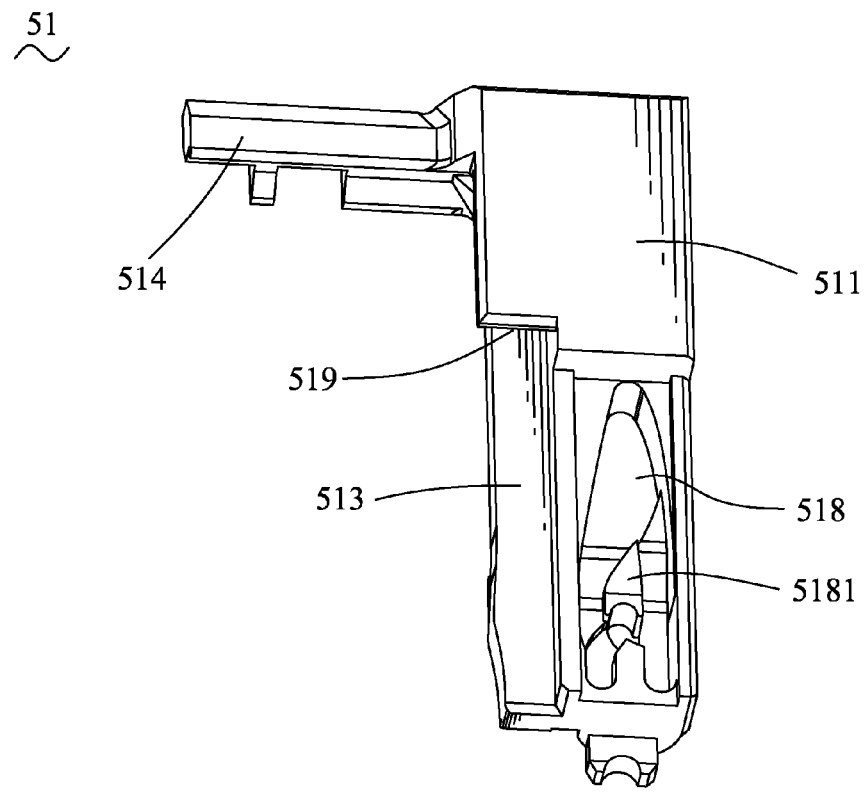
FIG. 4 is a perspective view of a sliding block of an ejection mechanism of the card connector of FIG. 2.
Figure 5:
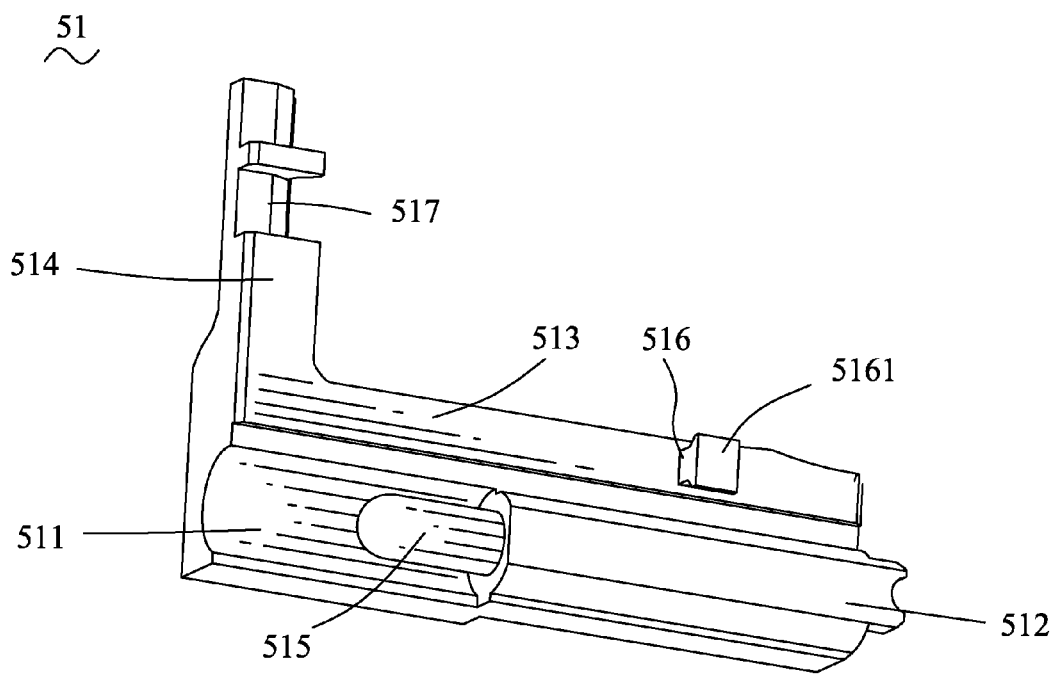
FIG. 5 is another angle perspective view of the sliding block of FIG. 5.
Figure 6:
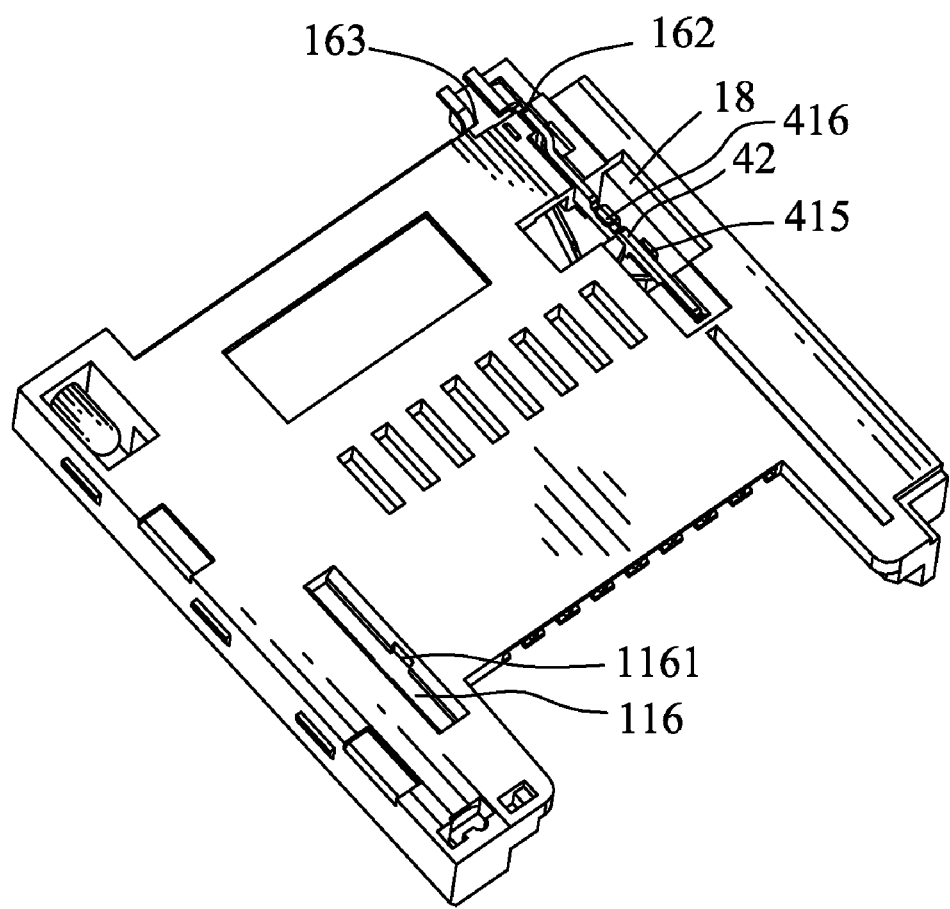
FIG. 6 is an assembly view of a switch terminal assembly and an insulating housing of the card connector of FIG. 3.
Figure 7:
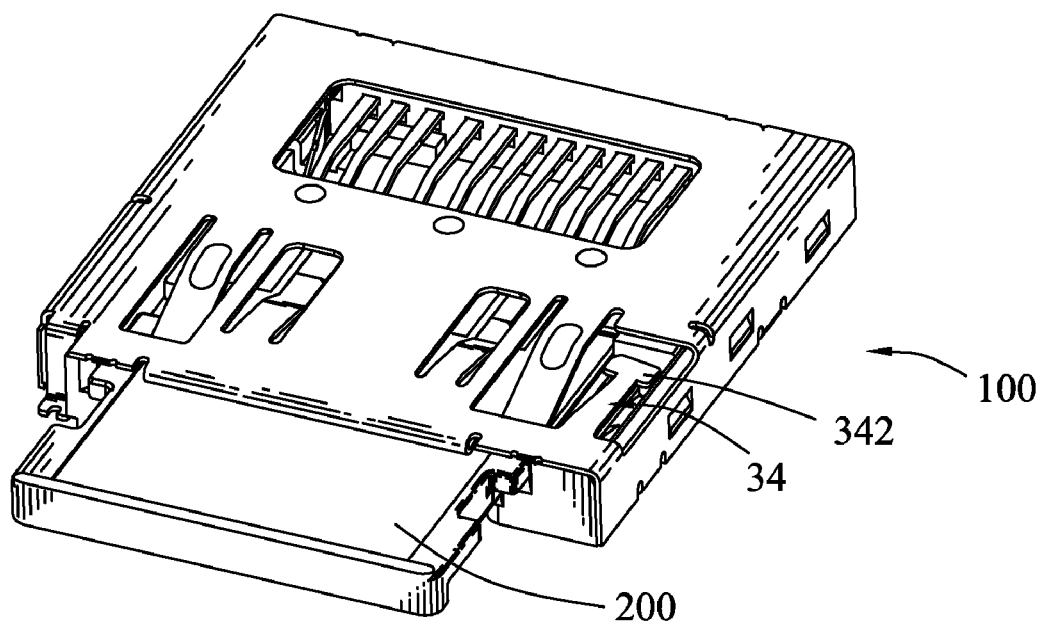
FIG. 7 is a perspective view showing that a card is inserted in the card connector of FIG. 1.
Figure 8:
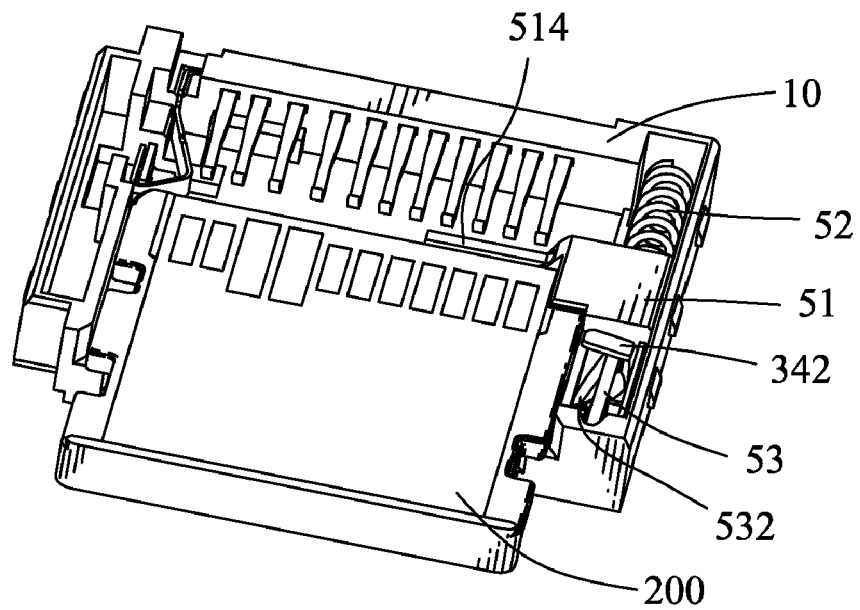
FIG. 8 is an assembly view of the card and the card connector of FIG. 7 except a shielding shell.

Referring to FIG. 3 and FIG. 6, the insulating housing 10 has a bottom wall 11 of a substantial rectangular shape, a rear wall 12 extending upward from a rear of the bottom wall 11, two side walls 13 extending upward from two opposite sides of the bottom wall 11 and connected with two ends of the rear wall 12 to define a receiving space 14 thereamong for receiving the card 200. A top of the bottom wall 11 defines a plurality of first terminal grooves 151 arranged at regular intervals along a transverse direction of the bottom wall 11 and each extending longitudinally to penetrate through a front of the bottom wall 11. The rear wall 12 defines a plurality of T-shaped second terminal grooves 152 arranged at regular intervals along the transverse direction of the rear wall 12 and each extending longitudinally to penetrate therethrough. A top of one end of the rear wall 12 defines an L-shaped first switch groove 161. A rear side of the rear wall 12 defines a passage 163 connecting with a rear end of the first switch groove 161. A bottom of the bottom wall 11 defines a second switch groove 162 extending longitudinally and adjacent to the first switch groove 161. The bottom wall 11 further defines an opening 18 passing through a substantial middle of the second switch groove 162 and connected with the receiving space 14. Each of the side walls 13 defines a plurality of buckling lumps 19 projecting outward.

Figure 2:
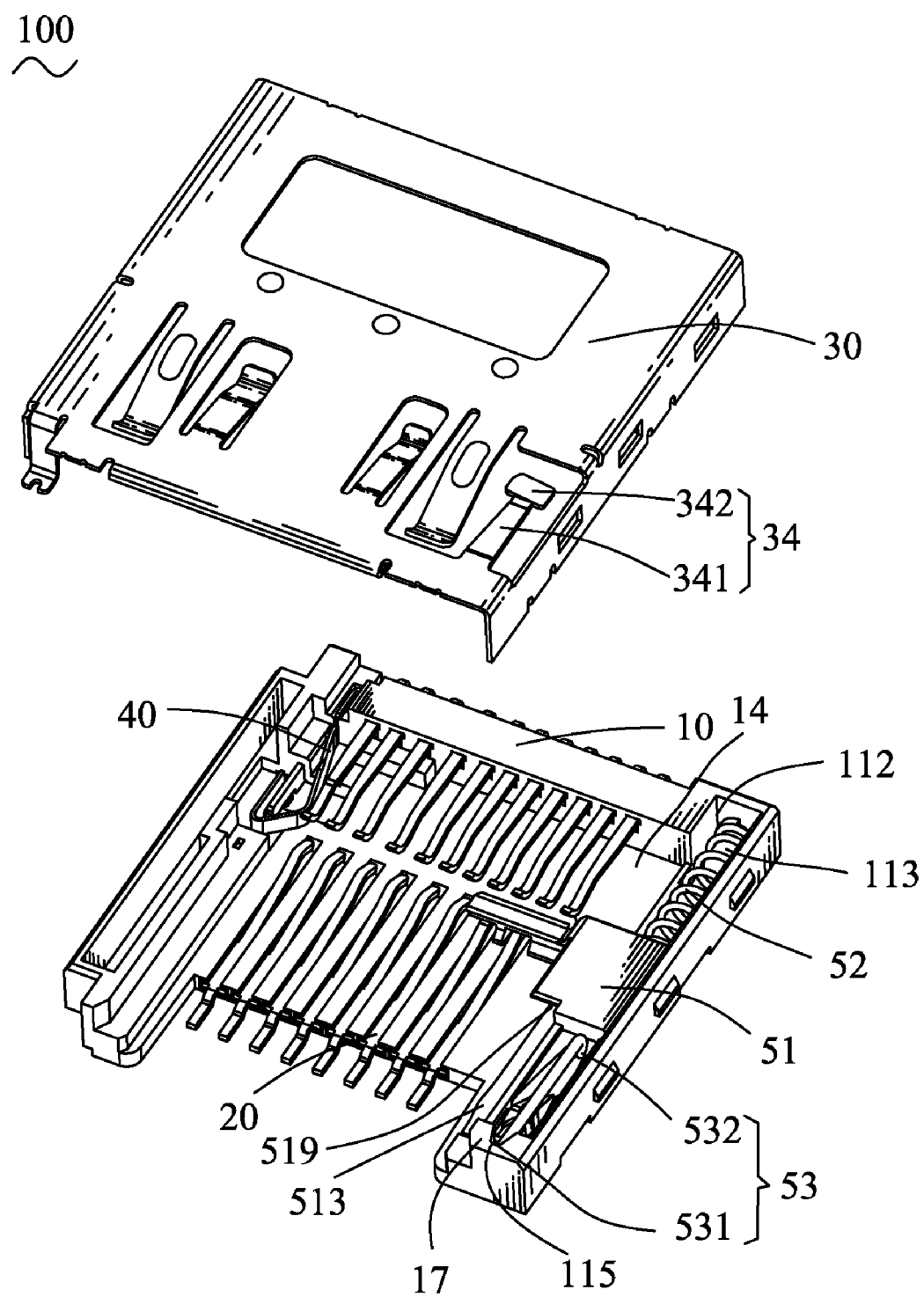
FIG. 2 is a partially exploded view of the card connector of FIG. 1.

Referring to FIG. 2, FIG. 3 and FIG. 6, one side of the top of the bottom wall 11 far away from the opening 18, the first switch groove 161 and the second switch groove 162 is concaved downward to form a receiving trough 112 extending longitudinally to passing through a front of the other end of the rear wall 12 and communicated with the receiving space 14. A holding pillar 113 projects forward from a rear surface of the receiving trough 112. The top of the bottom wall 11 further defines a guiding groove 116 extending longitudinally and adjacent to an inner side of the receiving trough 112. A substantial middle of the guiding groove 116 spreads outward to form a receiving groove 1161. A front wall of the receiving trough 112 is defined as a protrusion 17 with an insertion hole 115 being formed therein.

Referring to FIG. 3 and FIG. 6, the switch terminal assembly 40 includes a first switch terminal 41 and a second switch terminal 42. The first switch terminal 41 has an L-shaped first fixed portion 411 seen from a vertical view. A V-shaped elastic portion 412 is connected with a lower portion of a front end of the first fixed portion 411. A front end of the elastic portion 412 extends rearward to form a connecting portion 413. A rear end of the first fixed portion 411 extends downward and then is bent rearward to form a first soldering portion 414. A front portion of a bottom of the connecting portion 413 extends downward to form a first contact portion 415 and a rear portion of the bottom of the connecting portion 413 is bent towards the elastic portion 412 to form a second contact portion 416.

The second switch terminal 42 has a second fixed portion 421, a contact arm 422 inclined inward and then extending frontward from a front end of the second fixed portion 421, and a second soldering portion 423 arced inward from a rear end of a bottom edge of the second fixed portion 421. A top of a front end of the contact arm 422 defines a locating groove 424 and a bottom of a middle of the contact arm 422 defines a notch 425.

Referring to FIG. 2 and FIG. 3, the shielding shell 30 has a rectangular top plate 31. Two opposite sides of the top plate 31 extend downward to form a first side plate 32 and a second side plate 33. The top plate 31 defines a mouth 311 at a front portion thereof and adjacent to the first side plate 32. A pressing tab 34 is defined in the mouth 311 and has an elastic arm 341 extending rearward and inclined downward from a front edge of the mouth 311, and a pressing piece 342 extended outward and then rearward from a free end of the elastic arm 341. The first side plate 32 and the second side plate 33 respectively define a plurality of clipping grooves 35.

Referring to FIG. 2, FIG. 3, FIG. 4 and FIG. 5, the ejection mechanism 50 includes a sliding block 51, an elastic element 52 and a guide pin 53 of an inverted-U shape which includes a fastening portion 531 and a sliding portion 532. The sliding block 51 has a base body 511 having an arched bottom surface, a pushing body 512 projecting downward from a front of the bottom surface of the base body 511, a sliding body 514 extending transversely from a rear of the base body 511, and an elongated locking body 513 extending frontward from a root portion of the sliding body 514. The sliding body 514 defines a gap 517 at a bottom thereof and away from the base body 511. A location pillar 515 protrudes rearward from a rear of the pushing body 512 and is located below the arched bottom surface of the base body 511. A front of a bottom of the locking body 513 protrudes downward to form a guiding block 516 of which two sides oppositely protrude outward to form a locking block 5161 respectively. A top of a front of the base body 511 defines a substantially heart-shaped tracking groove 518 joined end to end. A heart-shaped resisting portion 5181 is formed in the tracking groove 518 and located apart from a periphery inside of the tracking groove 518. A side of the base body 511 adjacent to the sliding body 514 has a bottom thereof spaced from a top of the locking body 513 to define a positioning passage 519 therebetween.

Referring to FIGS. 1-6, when the card connector 1 is assembled, the first conductive terminals 21 are received in the first terminal grooves 151 and rear ends thereof project upward into the receiving space 14. The second conductive terminals 22 are received in the second terminal grooves 152 and front ends thereof project forward into the receiving space 14. The second switch terminal 42 is fastened in the second switch groove 162 with a substantial middle of the contact arm 422 exposed in the opening 18 and the second soldering portion 423 exposed under the bottom wall 11. The first fixed portion 411 of the first switch terminal 41 is fixed in the first switch groove 161 with the first soldering portion 414 passing through the passage 163 to project under the rear wall 12. The elastic portion 412 is located on the bottom wall 11 and stretches into the receiving space 14. A junction of the elastic portion 412 and the connecting portion 413 is located in the locating groove 424 to make the connecting portion 413 located at one side of the contact arm 422 opposite to the receiving space 14, the first contact portion 415 electrically contact with the one side of the contact arm 422 and the second contact portion 416 electrically buckled in the notch 425.

Then the ejection mechanism 50 is assembled in the insulating housing 10. The sliding block 51 is slidably disposed in the receiving trough 112 with the pushing body 512 located in a front of the receiving trough 112. The arched bottom surface of the base body 511 is coupled with the receiving trough 112 for receiving the elastic element 52 therein. One end of the elastic element 52 is worn around the location pillar 515 and against the rear of the pushing body 512, and the other end of the elastic element 52 is worn around the holding pillar 113 and against the rear surface of the receiving trough 112. The locking body 513 stretches into the receiving space 14 to make the positioning passage 519 communicated with the receiving space 14, with the guiding block 516 slidably received in the guiding groove 116 and the locking blocks 5161 capable of being buckled in the receiving grooves 1161 to position the sliding block 51. The sliding body 514 is located in the receiving space 14 with the gap 517 longitudinally aligned with one of the first terminal grooves 151 to avoid the sliding body 514 pressing the corresponding first conductive terminal 21. The fastening portion 531 of the guide pin 53 is inserted in the insertion hole 115, and the sliding portion 532 is slidably located in the tracking groove 518 of the sliding block 51. The shielding shell 30 is covered on the insulating housing 10 with the pressing piece 342 of the pressing tab 34 resisting on the guide pin 53 for restraining the guide pin 53 to steadily slide in the tracking groove 518 of the sliding block 51, and the buckling lumps 19 buckled in the clipping grooves 35 respectively.

Referring to FIGS. 1-8, the card 200 is inserted into the card connector 100 by means of sliding in the positioning passage 519 of the sliding block 51 to enter the receiving space 14 of the insulating housing 10 to prevent the card 200 deviating in the receiving space 14. The card 200 pushes the sliding body 514 of the sliding block 51 rearward to drive the sliding block 51 to slide rearward in the receiving trough 112 by virtue of the guidance of the guiding block 516 and the guiding groove 116 with the locking blocks 5161 blocked under two sidewalls of the guiding groove 116, so as to make the sliding block 51 straightly move rearward to compress the elastic element 52. The pressing piece 342 of the pressing tab 34 resists on the guide pin 53 and exerts a horizontal force on the guide pin 53 to make the sliding portion 532 of the guide pin 53 steadily slide in the tracking groove 518 until the sliding portion 532 is locked in the resisting portion 5181. Meanwhile, the guiding block 516 resists against a rear end wall of the guiding groove 116 to prevent the sliding block 51 from excessively sliding rearward in the insulating housing 10. At this moment, the card 200 is fully received in the receiving space 14 of the card connector 100. The elastic portion 412 of the first switch terminal 41 is pressed sideward by the card 200 to drive the first contact portion 415 and the second contact portion 416 to depart from the contact arm 422 of the second switch terminal 41 so as to realize a switch function of the switch terminal assembly 40.

When the card 200 is to be ejected from the card connector 100, push the card 200 rearward again to make the sliding portion 532 of guide pin 53 to re-slip into the tracking groove 518. Then the elastic element 52 is released to push the pushing body 512 forward and drive the sliding block 51 to slide forward under the guidance of the guiding block 516 and the guiding groove 116, so as to eject the card 200 outward by virtue of the sliding body 514 until the locking blocks 5161 are locked in the receiving grooves 1161 again. Then pull the card 200 forward to make the card 200 slide out of the positioning passage 519 so as to draw the card 200 out of the card connector 100 smoothly.

As described above, the card 200 is inserted into the card connector 100 by means of sliding in the positioning passage 519 to enter the receiving space 14 of the insulating housing 10 to prevent the card 200 deviating in the receiving space 14. Moreover, the guiding block 516 slides in the guiding groove 116 with the locking blocks 5161 blocked under two sidewalls of the guiding groove 116 so as to ensure a straight movement of the sliding block 51 for further avoiding the card 200 deviating. So, the card 200 can be received in the receiving space 14 accurately and steadily.

What is claimed is:

1. A card connector adapted for receiving a card, comprising
    an insulating housing having a bottom wall, a rear wall extending upward from a rear of the bottom wall, and two side walls extending upward from two opposite sides of the bottom wall and connected with two ends of the rear wall to define a receiving space thereamong for receiving the card, one side of the bottom wall defining a receiving trough extending along an insertion direction of the card adjacent to one side wall and communicated with the receiving space, the bottom wall defining a guiding groove extending longitudinally and adjacent to an inner side of the receiving trough;
    a plurality of conductive terminals received in the insulating housing and projecting into the receiving space for electrically connecting with the card;
    an ejection mechanism assembled in the one side of the insulating housing, the ejection mechanism including a sliding block slidably disposed in the receiving trough, an elastic element clipped between the sliding block and a rear face of the receiving trough, and a guide pin of an inverted-U shape of which one end is fastened in a front of the one side of the insulating housing and the other end is slidably located in the sliding block, the sliding block having a base body, a sliding body transversely extending sideward from a rear of one side of the base body to stretch into the receiving space for ejecting the card out, and a locking body extending frontward from a root portion of the sliding body and spaced from a bottom of the one side of the base body to define a positioning passage therebetween for guiding the card to enter the receiving space, a guiding block being protruded at a bottom of the locking body to be slidably located in the guiding groove so as to guide the slide of the sliding block; and a shielding shell covered on the insulating housing;
    wherein a gap is opened in a bottom of the sliding body, the sliding body is stretched in the receiving space with the gap longitudinally aligned with one of the terminal grooves;
    a first switch terminal which has an L-shaped first fixed portion fastened in one end of the rear wall away from the ejection mechanism, a V-shaped elastic portion connected with a front end of the first fixed portion to stretch into the receiving space, a connecting portion extending rearward from a front end of the elastic portion, a first contact portion and a second contact portion protruded at a bottom of the connecting portion, and a second switch terminal which has a second fixed portion fastened in the bottom wall and adjacent to the first switch terminal, and a contact arm curvedly extending frontward from a front end of the second fixed portion to have a substantial middle thereof exposed out through the top of the bottom wall, a top of a front of the contact arm defines a locating groove and a bottom of a substantial middle of the contact arm defines a notch, a junction of the elastic portion and the connecting portion is located in the locating groove to make the connecting portion located at one side of the contact arm opposite to the receiving space, the first contact portion electrically contact with the contact arm and the second contact portion electrically buckled in the notch, the elastic portion is pressed sideward by the card to make the contact portions depart from the contact arm in use.

2. The card connector as claimed in claim 1, wherein two sides of the guiding block oppositely protrude outward to form two locking blocks resisting under two sidewalls of the guiding groove during the guiding block slides in the guiding groove.

3. The card connector as claimed in claim 1, wherein a front of a bottom of the base body protrudes downward to form a pushing body located in the receiving trough, a location pillar protrudes rearward from a rear of the pushing body, a holding pillar projects forward from the rear face of the receiving trough, the elastic element has one end thereof worn around the location pillar and the other end thereof worn around the holding pillar.

4. The card connector as claimed in claim 1, wherein the shielding shell has a top plate of which one side of a front defines a mouth, a front edge of the mouth extends rearward and is inclined downward to form an elastic arm of which a rear end is extended outward and rearward to form a pressing piece resisting on the guide pin to realize a steady slide of the guide pin in the sliding block.

5. The card connector as claimed in claim 1, wherein a rear end of the first fixed portion extends downward and then is bent rearward to form a first soldering portion projected under the rear wall, a second soldering portion is bent sideward from a bottom edge of the second fixed portion to be projected under the rear wall.

* * * * *